April 27, 1965 J. D. NEWTON 3,181,130

CORE COUNTER

Filed June 30. 1961 2 Sheets-Sheet 1

INVENTOR
JOHN D. NEWTON

BY Frederick D. Poag
ATTORNEY

April 27, 1965 J. D. NEWTON 3,181,130

CORE COUNTER

Filed June 30. 1961 2 Sheets-Sheet 2

United States Patent Office 3,181,130

Patented Apr. 27, 1965

3,181,130

CORE COUNTER

John D. Newton, Kingston, N.Y., assignor to International Business Machines Corporation, New York, N.Y., a corporation of New York Filed June 30, 1961, Ser. No. 121,180
10 Claims. (Cl. 340—174)

This invention relates to magnetic core circuits and, more particularly, to counter circuits utilizing magnetic cores having square hysteresis loops.

Binary counters are commonly used in the electronic control art, particularly in digital computers. Each stage of such a counter comprises an individual binary counter which is also a storage device capable of storing either a ONE or a ZERO.

Heretofore, several types of magnetic core circuits have been used for performing the binary counting function. One type utilizes a single magnetic core to store the state of an individual binary stage. An output pulse is generated only when the magnetic core is, for example, reset from its ONE state.

In other types of counters, a plurality of magnetic cores have been used in each stage to provide storage and to make the stage easier to complement. In these counters, one magnetic core output will tend to inhibit the setting of another magnetic core. This inhibit function is particularly undesirable since it requires a very close synchronization of the output signals to make sure that the inhibit pulse arrives at the same time as the pulse which it is intended to inhibit.

Other prior art counters incorporate delay-line circuits within each stage to temporarily store the contents during the complementing of each stage.

The ability of a core driving circuit to switch magnetic cores is dependent upon the load which the cores present to the driving circuit. Prior magnetic core counters required core drivers to operate within very wide ranges of loading because the load presented to any one core driver was dependent upon the count in the counter.

Accordingly, it is an object of this invention to provide an improved magnetic core binary counter.

It is a further object of this invention to provide a magnetic core counter circuit capable of storing a single binary digit and generating an output when in either the ONE or the ZERO state.

It is an object of this invention to provide a counter which can be complemented without utilizing inhibit pulses.

A further object of this invention is to eliminate the use of delay-line circuits within the counter stages.

It is another object of this invention to provide, in certain embodiments, a magnetic core circuit in which the load on the driving circuits is independent of the contents of the counter.

In accordance with these and other objects, the invention provides a bistable device comprised of four square-hysteresis-loop magnetic cores in which one pair of cores provides a store for the count and the other pair of cores provides a temporary complementing store which is utilized during the complementing operation. One core in each of these pairs is for representing the ONE state and the other for representing the ZERO state of the bistable device. Therefore, a signal out of one core will indicate the ONE state and a signal out of the other core will indicate the ZERO state of the bistable device. In order to complement the device, a pulse is applied to transfer the contents of the storage pair of cores into the complement pair of cores. Then the complement pair of cores is reset and the contents transferred back to the storage pair of cores in complement form. By utilizing an output generated by and during the complementing operation (for example, upon reset of the ONE core of the storage pair of cores or upon reset of the corresponding ONE core of the complement pair of cores) to complement another bistable device, it is possible to provide a multi-stage binary counter. In the interest of speed and simplicity, the preferred embodiments utilize the storage core output for this purpose.

In one illustrated embodiment of the invention, the contents of the counter stage may be regenerated in the storage pair of cores by a transfer from the storage cores and complement cores of each stage into a transfer device and back again to the storage pair of cores of each device. At this time, the contents can, if desired, be transferred out to external circuitry. The load presented to the reset driver of this embodiment will always be constant since a single core out of each stage will always be set.

The foregoing and other objects, features and advantages of the invention will be apparent from the following more particular description of preferred embodiments of the invention, as illustrated in the accompanying drawings.

Figure 1:
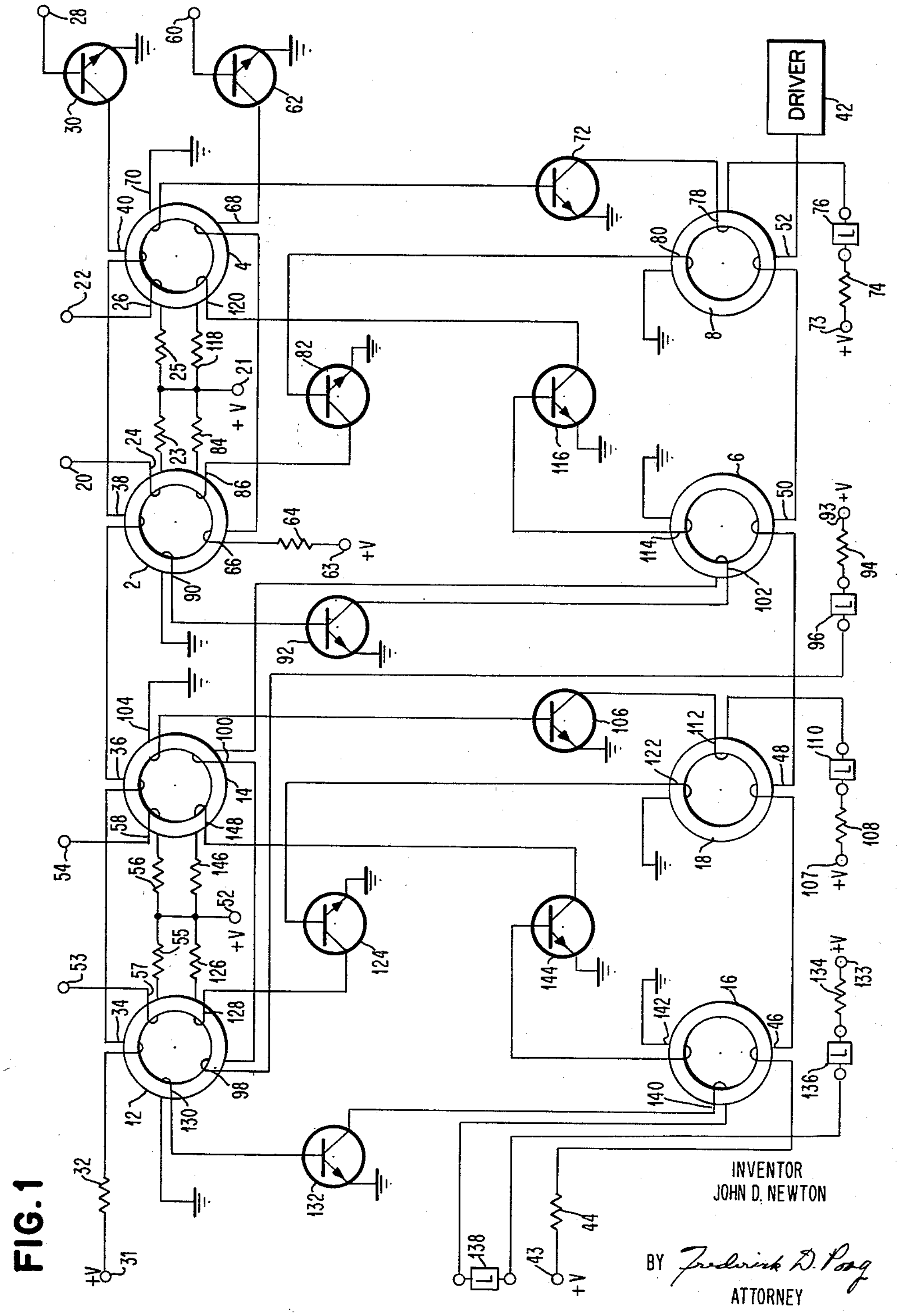
FIGURE 1 is a circuit diagram of two stages of a binary counter employing the concepts of this invention.

Referring now to FIGURE 1, two stages of a binary counter are shown. The lowest order stage comprises magnetic cores 2, 4, 6 and 8. The next higher order stage comprises cores 12, 14, 16 and 18. Each magnetic core is made of a magnetic material having a square hysteresis loop and each core, therefore, has two remanent magnetic states, "set" and "reset."

The lowest order stage is in the ONE binary state when magnetic core 2 is in a "set" state of magnetic remanence. When core 4 is in the "set" state of magnetic remanence, the stage is in the ZERO state. Magnetic cores 6 and 8 are utilized during complementing of the state of this stage.

In order to "set" the lowest order stage to the ONE state, the input 20 is grounded creating a current path from source of positive voltage 21 through current limiting resistor 23 and winding 24 to terminal 20, "setting" core 2. Likewise, the lowest order stage is set to the ZERO state by grounding input terminal 22 creating a current path from source of positive voltage 21 through current limiting resistor 25 and winding 26 to terminal 22, "setting" core 4.

The next higher order stage is similarly "set" to the ONE state by grounding input terminal 53, creating a path for current from source of positive voltage 52 through current limiting resistor 55 and winding 57 to drive core 12 to the "set" remanent state. This stage is "set" to the ZERO state by grounding input terminal 54, creating a current path from source of positive voltage 52 through current limiting resistor 56 and winding 58, driving core 14 to its "set" remanent state.

In order to completely clear all of the cores 2, 4, 12 and 14 to their "reset" remanent state, a positive voltage is applied at terminal 28, to turn on transistor 30 allowing current to flow from positive voltage source 31 through current limiting resistor 32, "reset" windings 34, 36, 38 and 40 and transistor 30 to ground. The complementing cores 6, 8, 16 and 18 may be simultaneously "reset" by "reset" driver 42, which, when energized, causes current to flow from source of positive voltage 43 through a current limiting resistor 44 and windings 46, 48, 50 and 52, for the purpose of driving cores 6, 8, 16 and 18 to their "reset" remanent state.

For the purpose of explaining counter operation, it may be assumed that each counter stage is set to its ZERO state by grounding input terminals 54 and 22, such that cores 4 and 14 are set to their "set" remanent states and all other cores are in their "reset" remanent states.

To step the counter, a positive pulse is applied at terminal 60 to turn on transistor 62 allowing current to flow from source of positive voltage 63 through current limiting resistor 64, winding 66 of core 2, winding 68 of core 4 and transistor 62 to ground. This current is in a direction which drives both of these cores to their "reset" remanent states. Since the stage is in its ZERO state core 2 is already in the "reset" remanent state and a change of flux will occur only in core 4. This change of flux causes a current to be generated in winding 70 in a direction to turn on transistor 72. As transistor 72 conducts, a current will flow from source of positive voltage 73 through current limiting resistor 74, load 76 and through winding 78 and transistor 72, setting core 8 to its "set" remanent state.

After a suitable delay to allow the transients in the circuit to diminish, current driver 42 is activated to cause current to flow from a positive source 43 through current limiting resistor 44, windings 46, 48, 50 and 52 and the driver to ground. Since only core 8 has been driven to its "set" remanent state, it is the only core which will be driven to the "reset" condition at this time. As core 8 is driven from the "set" remanent state to the "reset" remanent state, a current is generated in winding 80, which turns on transistor 82, allowing current to flow from source of positive voltage 21 through current limiting resistor 84 and winding 86 and transistor 82 to ground driving core 2 to the "set" remanent state.

No further action occurs during the first stepping operation. The lowest order stage is now in the ONE state since core 2 is at the "set" remanent state. The next higher order stage still remains in the ZERO state with core 14 in the "set" remanent state.

In order to again advance the count in the counter by one additional step, a positive step pulse is applied at input terminal 60 to turn on transistor 62 and allow a current to flow in winding 66 to drive core 2 to its "reset" remanent state. The change of flux in core 2, as it changes from its "set" remanent state to its "reset" remanent state, generates a current in winding 90 turning on transistor 92 to allow current to flow from source of positive voltage 93 through current limiting resistor 94, load 96, winding 98 on core 12, winding 100 on core 14, winding 102 on core 6 and through transistor 92 to ground. The current in winding 100 drives core 14 to its "reset" remanent state and the current in winding 102 drives core 6 from its "reset" remanent state to its "set" remanent state. Core 12, which is already in the "reset" remanent state, is unaffected since the current tends to drive it into this state. As core 14 is driven from its "set" to its "reset" remanent state, a current is generated in winding 104 which turns on transistor 106, causing current to flow from source of positive voltage 107 through a current limiting resistor 108, load 110, winding 112, and transistor 106 to ground, driving core 18 from its "reset" to its "set" remanent state. At this time, all of the cores of both stages of the counter are in the "reset" remanent state except cores 18 and 6. After a suitable delay to allow transients to diminish, driver 42 is activated and current flows in windings 48 and 50 to drive the cores 18 and 6, respectively, to their "reset" remanent state. As core 6 is driven from its "set" to its "reset" remanent state, a current is generated in winding 114, which turns on transistor 116 and allows current to flow from source of positive voltage 21 through current limiting resistor 118 and winding 120, and transistor 116 to ground, driving core 4 from its "reset" to its "set" remanent state. At the same time, the change of flux in magnetic core 18 induces a current in winding 122, which turns on transistor 124, allowing current to flow from source of positive voltage 52 through current limiting resistor 126 and winding 128 causing core 12 to be driven from its "reset" to its "set" remanent state. At this time, the lowest order stage of the counter is in the ZERO state and the next higher order stage of the counter is in the ONE state.

To again advance the count of the counter by one, another step pulse is applied to terminal 60 causing core 4 to be "reset" and core 8 to be "set." Driver 42 is then activated and core 8 is "reset" and core 2 is driven to its "set" remanent state.

The next step pulse applied at terminal 60 will cause core 2 to be driven to its "reset" remanent state. This will induce a current in winding 90 which turns on transistor 92, allowing current to flow from source of positive voltage 93 though current limiting resistor 94, load 96, windings 98, 100 and 102 to drive core 12 from its "set" remanent state to its "reset" remanent state and to drive core 6 from its "reset" remanent state to its "set" remanent state. As core 12 is switched from its "set" remanent state to its "reset" remanent state, a current is induced in winding 130 to turn on transistor 132, allowing current to flow from positive voltage source 133 through current limiting resistor 134, loads 136 and 138, winding 140 of core 16 and transistor 132 to ground. The current flowing through winding 140 of core 16 will drive core 16 from its "reset" remanent state to its "set" remanent state.

Load 138 may comprise "reset" windings of two cores of a next higher order stage. These cores would be connected into the current path of transistor 132 in a manner similar to that in which windings 98 and 100 of cores 12 and 14, respectively, are connected in the current path of transistor 92. If there is no higher order stage in the counter the load may comprise merely a short circuit connection.

After a suitable delay, to allow transients to diminish, driver 42 is activated causing current to flow in windings 46 and 50 to drive cores 16 and 6, respectively, from their "set" remanent state to their "reset" remanent state. As core 6 is driven from its "set" to its "reset" remanent state, it induces a current in winding 114, which turns on transistor 116, allowing current to flow in winding 120 of core 4 and switching core 4 from its "reset" to its "set" remanent state.

As core 16 is driven from its "set" to its "reset" remanent state, a current is generated in winding 142 which turns on transistor 144, allowing current to flow from positive voltage source 52 through current limiting resistor 146, winding 148 of core 14 and transistor 144 to ground. Current flowing in winding 148 of core 14 drives the core from its "reset" to its "set" remanent state.

At this time, the counter has been returned to its original setting with both stages in the ZERO state.

In this embodiment, the loads, 76, 96, 110, and 136 may be utilization devices to which the information contained in the counter is to be transferred. When transferring the contents of the counter to the external utilizaion devices, drivers 30 and 42 are applied simultaneously until all cores have been reset. After the reset transients have died down, the same count (or any other number) may be transferred into the counter via lines 20, 22, 53, 54.

Figure 2:
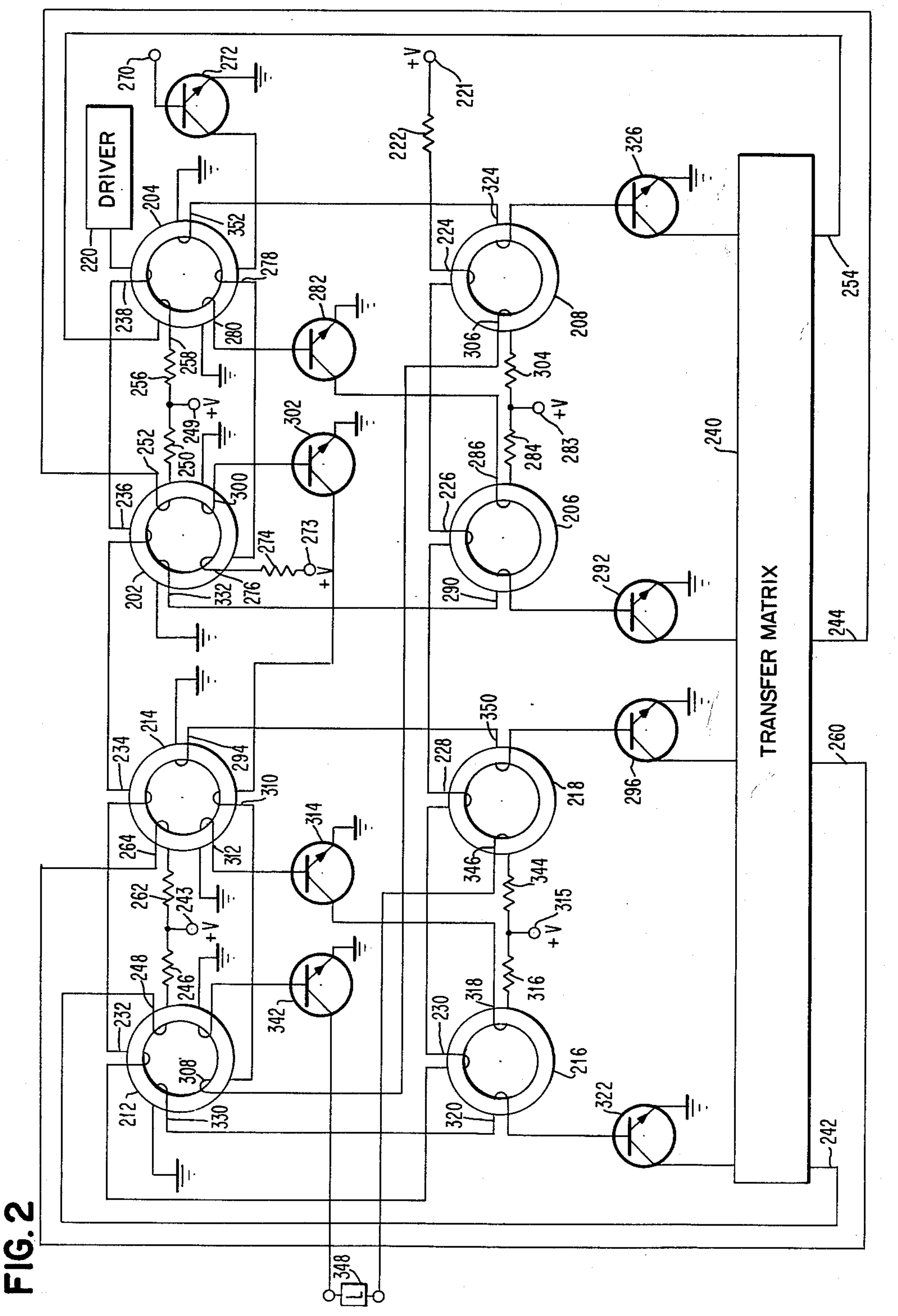
FIGURE 2 is a circuit diagram of two stages of an alternative embodiment of this invention.

Referring now to FIGURE 2, there is shown another embodiment of the counter of this invention. Cores 202, 204, 206 and 208 comprise the lowest order stage of the counter and cores 212, 214, 216 and 218 comprise the next higher order stage of the counter. As in the counter of FIGURE 1, the magnetic cores each have a "set" and a "reset" remanent state. The lowest order stage in the counter is in the ONE state if core 202 is in the "set" remanent state and in the ZERO state if core 204 is in the "set" remanent state. Likewise, if core 212 is in the "set" remanent state, the next higher order is in the ONE state, and, if core 214 is in the "set" remanent state, it is in the ZERO state.

The cores may originally be driven to the "reset" remanent state by activating driver 220 to cause current to flow from source of positive voltage 221 through current limiting resistor 222, and reset windings 224, 226, 228, 230, 232, 234, 236 and 238 and driver 220 to ground. If it were desirable to set both of the stages to their ONE state, the transfer matrix 240 would provide two current paths. The first of these paths is from source of positive voltage 243 through current limiting resistor 246, winding 248 and line 242 causing core 212 to be driven to its "set" remanent state. The second current path is from source of positive voltage 249 through current limiting resistor 250, winding 252 and line 244 causing core 202 to be driven to its "set" remanent state.

Transfer matrix 240 may be, for example, a circuit of the type disclosed in similarly assigned copending application Serial Number 56,027 of Andrews et al., filed September 14, 1960, now Pat. No. 3,054,986.

For the purposes of this explanation, it will be assumed that the counter is initially set to the ZERO state. This is done through the transfer matrix by providing current in line 254 from source of positive voltage 249 through current limiting resistor 256 and winding 258, driving core 204 to its "set" remanent state, and in line 260 from source of positive voltage 243 through current limiting resistor 262 and winding 264, driving core 214 to its "set" remanent state.

To step the counter, a positive step pulse is applied at terminal 270 to turn on transistor 272, allowing current to flow from source of positive voltage 273 through current limiting resistor 274 and windings 276 and 278 in the direction to drive both cores 202 and 204 to their "reset" remanent states. Since core 202 is in its "reset" remanent state, no change of flux occurs, but core 204 is driven to its "reset" remanent state. The change of flux in core 204 induces a current in winding 280 which turns on transistor 282 allowing current to flow from source of positive voltage 283 through current limiting resistor 284 and winding 286 causing core 206 to be switched from its "reset" to its "set" remanent state.

After a suitable period of delay for transients to diminish, driver 220 is activated, to cause current flow from source of positive voltage 221 through current limiting resistor 222 and windings 224, 226, 228, 230, 232, 234, 236 and 238 to attempt to drive all of the cores from the "set" to the "reset" remanent state. However, only one core in each stage of the counter will be in the "set" remanent state at this time. In the lowest order stage, only core 206 is in the "set" remanent state, and, in the next higher order stage, only core 214 is in the "set" remanent state.

As core 206 is driven from the "set" to the "reset" remanent state, a current is induced in winding 290, which turns on transistor 292 and causes a transfer of this information to transfer matrix 240. The significance of this transfer is that the information transferred into the matrix is indicative that the stage is in the ONE state. At the same time, core 214 is driven from its "set" to its "reset" remanent state, causing current to be induced in winding 294 turning on transistor 296, which transfers information to transfer matrix 240. The significance of this transfer is that the information transferred to the transfer matrix is indicative that this stage of the counter is in the ZERO state. After this transfer of information, the information is transferred from the transfer matrix in the form of current in windings 260 and 244, which, respectively, drive cores 214 and 202 to thier "set" remanent state. The counter now has a ONE in the lowest order stage and a ZERO in the next higher order stage.

To advance the count by one, another step pulse is applied at terminal 270 to turn on transistor 272, causing core 202 to be driven from the "set" to the "reset" stable state. During this change of state, current will be induced in winding 300 to turn on transistor 302, allowing current to flow from source of positive voltage 283 through current limiting resistor 304 and windings 306, 308 and 310 and transistor 302 to ground. This current tends to drive core 208 to the "set" remanent state and cores 212 and 214 to the "reset" remanent state. At this time, core 214 will be driven from the "set" to the "reset" remanent state, inducing a current in winding 312 to turn on transistor 314, allowing current to flow from source of positive voltage 315 through current limiting resistor 316 and winding 318 causing core 216 to be driven from the "reset" to the "set" remanent state.

After a suitable delay to allow the transients to diminish, driver 220 is activated to drive all of the cores to their "reset" remanent state. Core 216 being reset, a current is induced in winding 320 which turns on transistor 322 transferring information to the transfer matrix signifying that the second stage of the counter is in the ONE state. At the same time, core 208 is also driven from the "set" to the "reset" remanent state inducing a current in winding 324 which turns on transistor 326 and transfers information to the transfer matrix 240 signifying that the lowest order stage is in the ZERO state. This information will then be transferred from the transfer matrix on lines 242 and 254 which drive cores 212 and 204 to the "set" remanent state by current in windings 248 and 258, respectively.

To again advance the state of the counter by one, a positive step pulse is applied to terminal 270 to turn on transistor 272 causing core 204 to be driven to its "reset" remanent state. As core 204 switches from the "set" to the "reset" remanent state, a current is induced in winding 280 which turns on transistor 282, allowing current to flow through winding 286, driving core 206 to the "set" remanent state. Driver 220 is then activated to transfer the contents of the counter to the transfer matrix leaving all the cores in the "reset" remanent state. Core 206 is driven from the "set" to the "reset" remanent state, inducing a current in winding 209 to turn on transistor 292 and transferring information to the transfer matrix signifying that the lowest order stage is in the ONE state. At the same time, core 212 is driven to the "reset" remanent state inducing a current in winding 330 which turns on transistor 322 and transfers information to the transfer matrix signifying that the next higher order stage is in the ONE state.

The information is transferred from the transfer matrix via lines 242 and 244, which respectively drive cores 212 and 202 to the "set" remanent state by current in windings 248 and 252. At this time, the counter contains ONE in the lowest order stage and ONE in the next higher order stage.

If, at this time, it were desirable to utilize the contents of the counter, driver 220 would be activated and the cores would be driven to their "reset" state. As core 202 is switched, it would generate a current in winding 332, which would turn on transistor 292 to transfer the information to the transfer matrix to indicate that the lowest order stage is in the ONE state. Likewise, core 212 would generate a current in winding 330 which would turn on transistor 322 to transfer the information to the transfer matrix that the next higher order stage is in the ONE state. This information could be utilized in other parts of a computer by transferring from the transfer matrix to the other location.

The information would be restored in the counter from the transfer matrix in the same way as previously described via lines 242 and 244.

If it is once more desired to step the counter by one, a step pulse is applied to terminal 270 to turn on transistor 272, causing core 202 to be driven to its "reset" remanent state. Transistor 302 is turned on by current induced in winding 300, causing a current in winding 308 to drive core 212 to its "reset" remanent state and also driving core 208 to its "set" remanent state by current in winding 306. As core 212 switches from its "set" to its "reset" remanent state, a current is induced in winding 340 which turns on transistor 342, allowing current to flow from source of positive voltage 315 through current limiting resistor 344, winding 346 of core 218, load 348, and transistor 342 to ground.

The load 348 may be the reset winding of two cores of a next higher order stage in the same relationship to transistor 342 as windings 308 and 310 are to transistor 302. If no higher order stage of the counter is provided, load 348 may be directly short-circuited.

Current in winding 346 drives core 218 from the "reset" to the "set" remanent state. Driver 220 is activated and cores 218 and 208 are driven from their "set" to their "reset" remanent state. As core 218 switches from the "set" to the "reset" remanent state, a current is induced in winding 350, which turns on transistor 296, transferring information to the transfer matrix signifying that this stage of the counter is in the ZERO state. Likewise, as core 208 is driven from its "set" to its "reset" remanent state, current is induced in winding 324, turning on transistor 326 to transfer the information to the transfer matrix that the lowest order stage is also in the ZERO state.

After a suitable delay, this information will be transferred from transfer matrix via lines 260 and 254 to respectively drive cores 214 and 204 to their "set" remanent state.

The contents of the counter again may be utilized by activating driver 220 to transfer the contents of the counter to transfer matrix 240. A current will be induced in winding 294 to turn on transistor 296 and in winding 352 of core 204, turning on transistor 326 to transfer the contents to the transfer matrix.

The foregoing have been described in terms of a count-up counter; it will be seen that the same circuits may be employed as count-down counters merely by reversing the ONE and ZERO significance of the cores.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A binary counter comprising: first, second, third, and fourth square-hysteresis loop magnetic cores, each having a first and a second state of magnetic remanence; first sensing means responsive to a change of state of said first core to change the state of said third core; second sensing means responsive to a change of state of said second core to change the state of said fourth core; third sensing means responsive to a change of state of said third core to change the state of said second core; and fourth sensing means responsive to a change of state of said fourth core to change the state of said first core; first reset means for resetting said first and second cores; second reset means for resetting said third and fourth cores whereby sequential activation of said first and second reset means will advance the count in said counter.

2. The counter of claim 1 further comprising: fifth and sixth square hysteresis loop magnetic cores, each having a first and a second state of magnetic remanence; seventh and eighth square hysteresis loop magnetic cores, each having a first and a second state of magnetic remanence; fifth sensing means responsive to a change of state of said fifth core to change the state of said seventh core; sixth sensing means responsive to a change of state of said sixth core to change the state of said eighth core; seventh sensing means responsive to a change of state of said seventh core to change the state of said sixth core; eighth sensing means responsive to a change of state of said eighth core to change the state of said fifth core; third reset means responsive to said second sensing means for resetting said fifth and sixth cores; and fourth reset means for resetting said seventh and eighth cores.

3. In a binary counter having a plurality of stages, a first stage having a plurality of magnetic cores; a second stage of higher order than said first stage, having a first square hysteresis loop magnetic core for storing the ONE state and a second square hysteresis loop magnetic core for storing the ZERO state of the stage; sensing means associated with a first core of said plurality of cores of said first stage and responsive to a change of state of said first core of said first stage; and reset means for resetting both of said first and second magnetic cores of said second stage, said reset means being responsive to said sensing means to reset both of said first and second magnetic cores of said second stage; and means for complementing the state of said second stage, including means responsive to a change of state of either one of said cores of said second stage.

4. The counter of claim 3 wherein said complementing means includes third and fourth magnetic cores in said second stage for temporarily storing information which is a function of the state of this stage.

5. The counter of claim 3 wherein said complementing means includes third and fourth magnetic cores in said second stage for temporarily storing information which is a function of the state of this stage, and further comprising driver means for resetting said first, second, third, and fourth cores of said second stage.

6. In a binary counter in which each stage has a ONE core which is set when the stage is in the ONE state and a ZERO core which is set when the stage is in the ZERO state, first reset means for resetting said ZERO core to initiate a change of state from ZERO to ONE of the counter stage, magnetic core means responsive to the resetting of said ZERO core for temporarily storing the ZERO state of the stage; second reset means for resetting said magnetic core means; and means responsive to the resetting of said magnetic core means to set said ONE core.

7. In a binary counter in which each stage has a ONE core which is set when the stage is in the ONE state, a ZERO core which is set when the stage is in the ZERO state, and two buffer storage cores corresponding with said ONE and said ZERO cores for temporarily storing the state of the stage during a complementing operation, means for resetting and transferring the contents of said ONE and said ZERO cores to corresponding buffer storage cores of a counter stage; transfer means responsive to a reset change of state of said ONE core, said ZERO core, or said buffer storage cores to transfer their contents to said ONE core or said ZERO core; and driver means for resetting said ONE core, said ZERO core and said storage buffer cores whereby the load on said driver means is substantially independent of whether the stage is complemented.

8. In a binary counter having a plurality of binary stages, each stage comprising four square hysteresis loop magnetic cores, means responsive to a change of state of the first magnetic core of a stage for changing the state of the third magnetic core of the same stage; means in each stage responsive to a change of state of the second magnetic core of a stage to change the state of the fourth magnetic core of the same stage and to drive the first and second magnetic cores of the next higher order stage in the direction of reset them; stepping means associated with said first and said second cores of the lowest order stage of said counter to simultaneously drive said first and said second cores of said lowest order stage in the direction to reset them; reset means associated with all of said magnetic cores of all of said stages of said counter to reset all cores simultaneously; first transfer means responsive to a change of state of first and said fourth magnetic cores of each stage for transferring the contents of either said first or said fourth magnetic core of each stage to said first magnetic core of the same stage; second transfer means responsive to a change of said second and said third magnetic core of each of said stages for transferring the contents of either said second or said third magnetic core to said second magnetic core of the same stage.

9. In a magnetic core binary counter, first and second magnetic cores for storing a manifestation of a ONE and ZERO state, respectively; third and fourth magnetic cores for respectively storing information indicative of the ONE or ZERO state of the counter; means for impressing electrical manifestations of information on said first and second magnetic cores to set one of said cores; means for transferring information from said first and said second magnetic cores to said third and said fourth magnetic cores, respectively; and means for transferring information from said third and said fourth magnetic cores to said second and said first magnetic cores, respectively, the contents of said first and second magnetic cores being in this manner complemented.

10. In a binary counter having a plurality of binary stages, each stage comprising a magnetic core storage circuit having first, second, third and fourth magnetic cores with substantially rectangular hysteresis loops, the combination comprising: input windings linking said first and second cores of the stage; means responsive to a voltage output from said first core and operatively connected to said third core to set said third core when an output occurs from said first core; means responsive to an output voltage from said second core, operatively connected to said fourth core to set said fourth core when an output occurs from said second core and operatively connected to the input windings of said first and second cores of the next higher order stage; means responsive to the output of said third core for setting said second core; means responsive to the output of said fourth core for setting said first core; reset means linking said third and fourth cores of all stages; first pulse generation means for supplying input pulses to be counted to said input winding of said first stage; and second generation means to supply a pulse to said reset means to reset all of said third and fourth cores to transfer information back to said first and said second cores of each stage.

References Cited by the Examiner

UNITED STATES PATENTS

| | | | |
|---|---|---|---|
| 2,735,021 | 2/56 | Nilssen | 307—88 |
| 2,781,503 | 2/57 | Saunders | 340—174 |
| 2,925,500 | 2/60 | Meyerhoff | 340—174 |

MALCOLM A. MORRISON, *Primary Examiner.*

WALTER W. BURNS, Jr., *Examiner.*